Dec. 11, 1951 J. V. FREDD 2,578,236

TUBING CALIPERING DEVICE

Filed Nov. 13, 1950 5 Sheets-Sheet 1

INVENTOR.
JOHN V. FREDD

BY

Busser and Harding

ATTORNEYS

Dec. 11, 1951 J. V. FREDD 2,578,236

TUBING CALIPERING DEVICE

Filed Nov. 13, 1950 5 Sheets-Sheet 2

INVENTOR.
JOHN V. FREDD

BY Busser and Harding

ATTORNEYS

Dec. 11, 1951 J. V. FREDD 2,578,236

TUBING CALIPERING DEVICE

Filed Nov. 13, 1950 5 Sheets-Sheet 3

INVENTOR.
JOHN V. FREDD
BY
Busser and Harding
ATTORNEYS

Dec. 11, 1951 J. V. FREDD 2,578,236

TUBING CALIPERING DEVICE

Filed Nov. 13, 1950 5 Sheets-Sheet 4

INVENTOR.
JOHN V. FREDD

BY

Busser and Harding

ATTORNEYS

TUBING CALIPERING DEVICE

Filed Nov. 13, 1950 5 Sheets-Sheet 5

INVENTOR.
JOHN V. FREDD
BY
Busser and Harding
ATTORNEYS

Patented Dec. 11, 1951 2,578,236

UNITED STATES PATENT OFFICE 2,578,236

TUBING CALIPERING DEVICE

John V. Fredd, Dallas, Tex., assignor to Otis Pressure Control, Inc., Dallas, Tex., a corporation of Delaware Application November 13, 1950, Serial No. 195,366

5 Claims. (Cl. 33—178)

The present invention relates in general to tube calipering devices, and more particularly to calipering devices suitable for use within extended lengths of tubing such as within an oil or gas well.

Tubing or casing used in the production of gas and oil is subjected periodically to calipering operations to determine further usefulness. The apparatus used presently in these operations is designed to indicate pits and depressions on the internal surface of the tubing and record their location on a chart. In constructing tube calipering devices suitable for use in small diameter tubing, difficulty has been experienced in combining the operating elements and in overcoming operational obstacles of wire line drag and the impacts on the stylus drive mechanisms resulting from striking of conventionally mounted drive wheels adjacent tubing couplings.

The physical limitations of calipering devices heretofore in use have restricted the recording operation to tubing in excess of two inches in diameter due to the cramped space for the operation of the recording elements. It is an object of this invention to provide an arrangement of elements especially suited for accurate calipering within tubing of relatively small diameter.

It is a further object of this invention to provide an improved driving mechanism frictionally operable within the tubing being calipered, which mechanism reduces the objectionable drag on the supporting lines, developes a large driving torque, and gives smooth operating performance.

The device of the present invention includes improved driving means for the recording mechanism which is useful in combination with various arrangements of calipering or feeler mechanisms. Particularly suitable feeler mechanism is disclosed in my copending application Serial No. 97,940, filed June 9, 1949. Such feeler mechanism comprises a plurality of independently operable calipering elements or feelers, each of which contacts the inner wall of the tubing during a calipering passage of the device and is actuated in accordance with any pit or depression encountered. A stylus positioned in recording relation to a cylindrical chart is actuated in response to the greatest outward feeler movement at any instant during calipering, thus producing on the chart a continuous record showing only the deepest pits or depressions in the tubing. At the joint connections of the tubing all the feeler arms move outwardly as a group and indicate the joint location by moving the stylus a regulated distance.

The recording mechanism disclosed in the aforesaid copending application includes a stylus rotatable and longitudinally movable on a fixed lead screw for scribing a normally helical line on the inner surface of a fixed cylindrical chart. The present invention provides an improvement in such mechanism which is particularly advantageous for calipering devices of small diameter. Such improvement is effected by rotating the lead screw in the same direction as the stylus and at a predetermined greater speed. This provides accurate control of the desired pitch of the helical line scribed on the chart while permitting the use of elements of less bulk which can be more readily incorporated within smaller calipering devices and consequently increases the sensitivity of the instrument.

The rotative effect of the stylus and the lead screw with relation to each other is brought about through the medium of gears meshed in operating relation, in turn rotated by a drive mechanism maintained in friction contact with the inner surface of the tubing. The drive mechanism comprises a rotatable drive member mounted at one end of the housing and carrying drive wheels positioned angularly with respect to both the axis and transverse section of the device and adapted to engage the inner wall of the tubing. The angular positioning of the drive wheels causes them to follow a helical path as the device passes through the tubing, thereby effecting rotation of the drive member. The transmission between the drive member and the recording mechanism preferably includes a wobble gear arrangement designed to move one gear tooth in rotation for each revolution of the drive member. This arrangement is especially useful for obtaining a predetermined reduction in rotary movement between the drive member and the recording mechanism in small diameter calipering devices.

The movement of the calipering elements, each of which has a spring to exert pressure outwardly toward the tubing surface for calipering, is transmitted to the stylus through the rotatable lead screw. The bearing surfaces of the calipering elements are in contact with the stylus rod which, in turn, is in contact with the lead screw and thus transmit all irregularities of the tubing surface to the stylus. A driving mechanism engages the stylus holder and rotates the stylus on the more rapidly rotating lead screw within the cylindrical chart, positioned as described above, to scribe the record of the calipering operation.

In order that a better understanding of the invention may be had, reference is made to the following detailed description and to the accompanying drawings in which.

Figure 6:
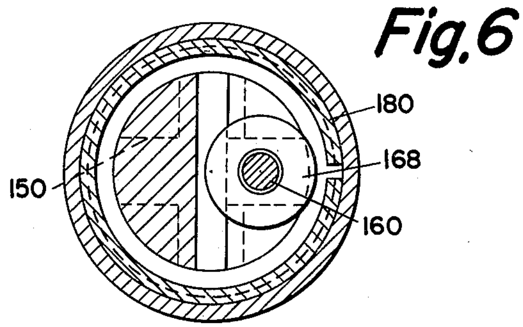
Figure 7:
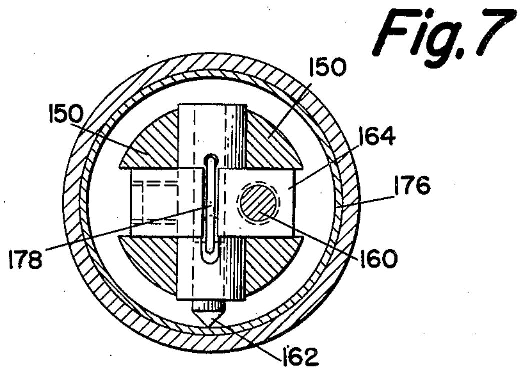
Figure 8:
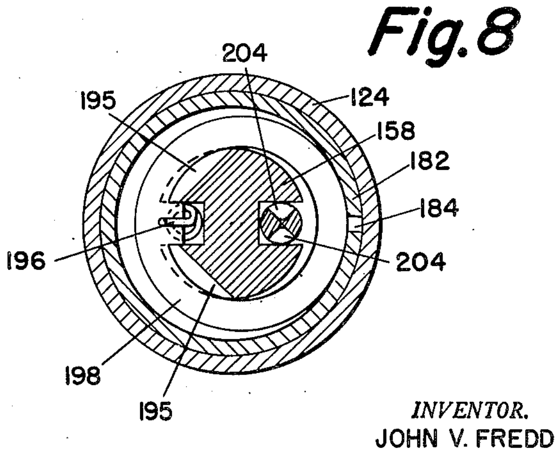
Figure 4:
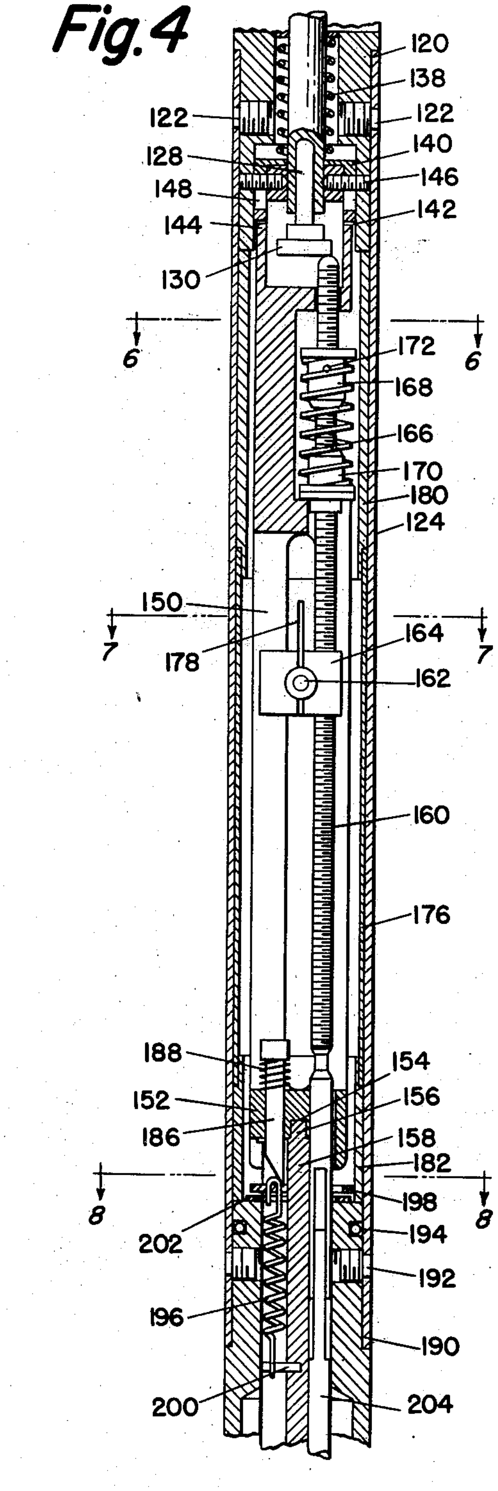
Figure 4 is a sectional elevation of the chart chamber section of Figure 1.

Figures 6, 7 and 8 are cross-sections of the chart chamber section taken on lines 6—6, 7—7 and 8—8 of Figure 4.

Figure 5:
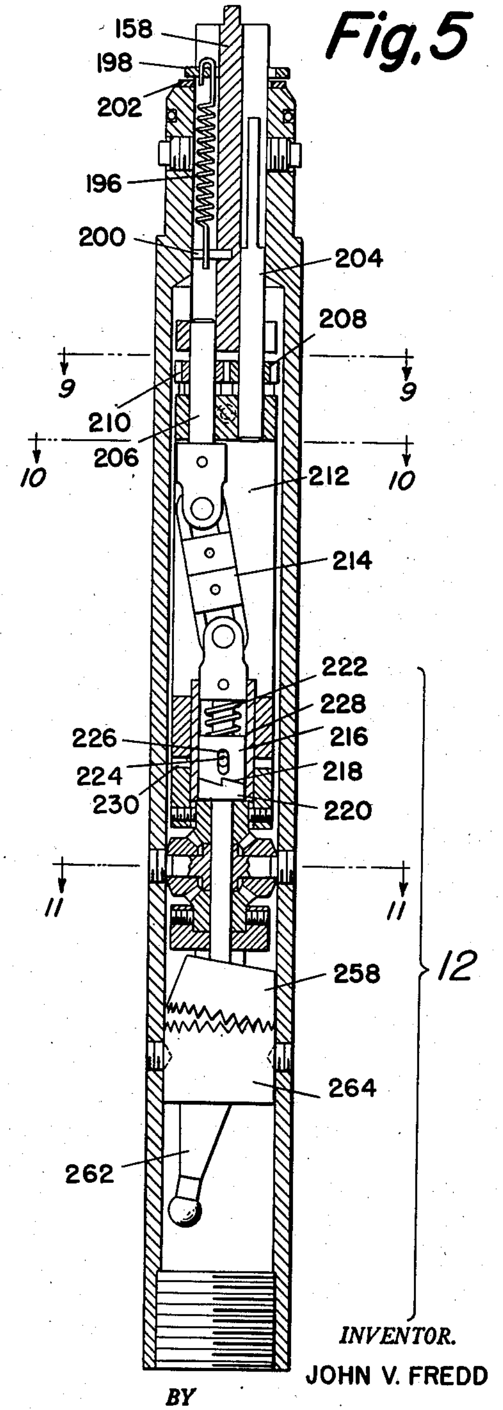
Figure 5 is a sectional elevation of the ratchet assembly section of Figure 1.
Figure 9:
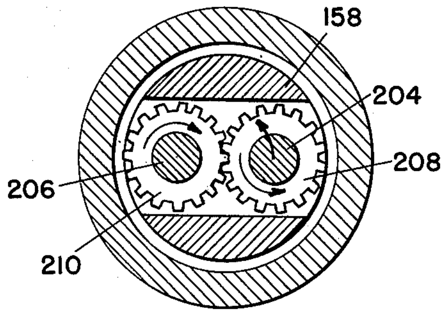
Figure 11:
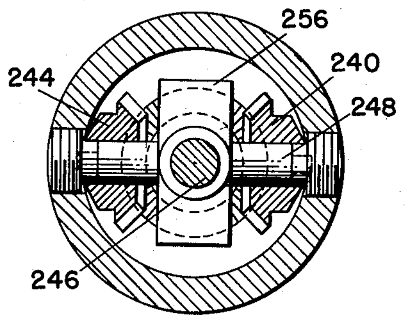
Figure 10:
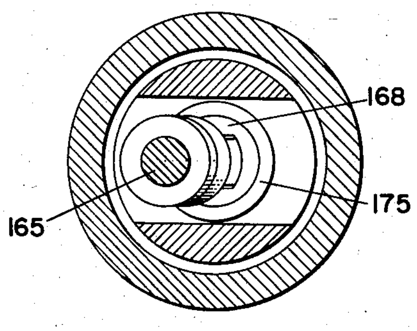

Figures 9, 10 and 11 are cross-sections of the ratchet assembly section taken on lines 9—9, 10—10 and 11—11 of Figure 5.

Figure 12:
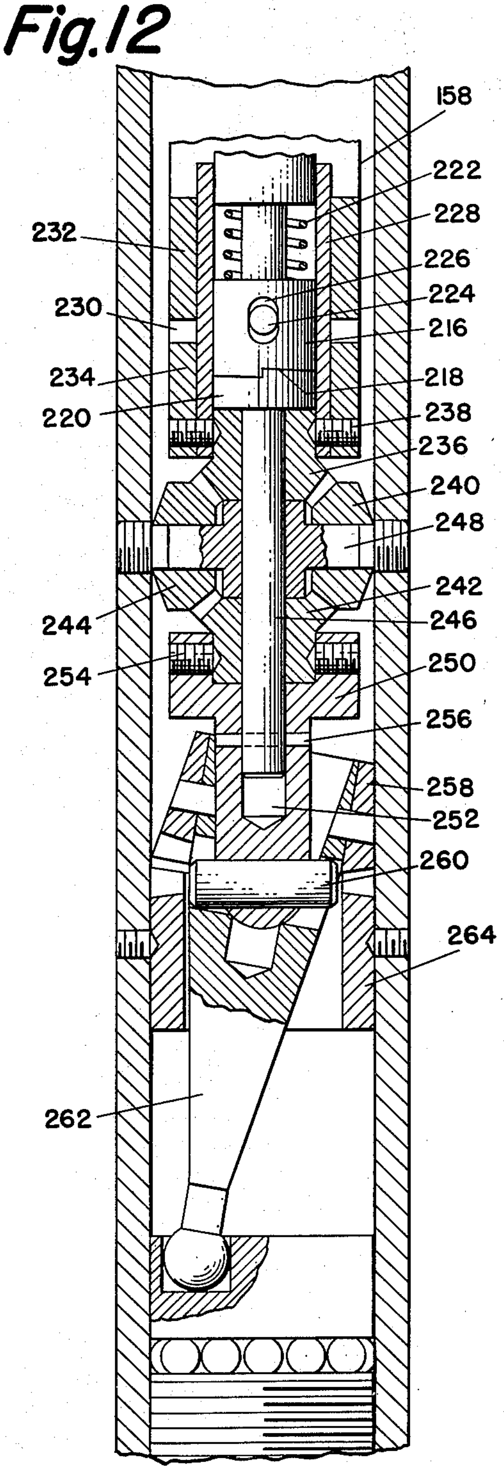

Figure 12 is an enlarged elevation section of Figure 5 taken on line 12—12.

Figure 1:
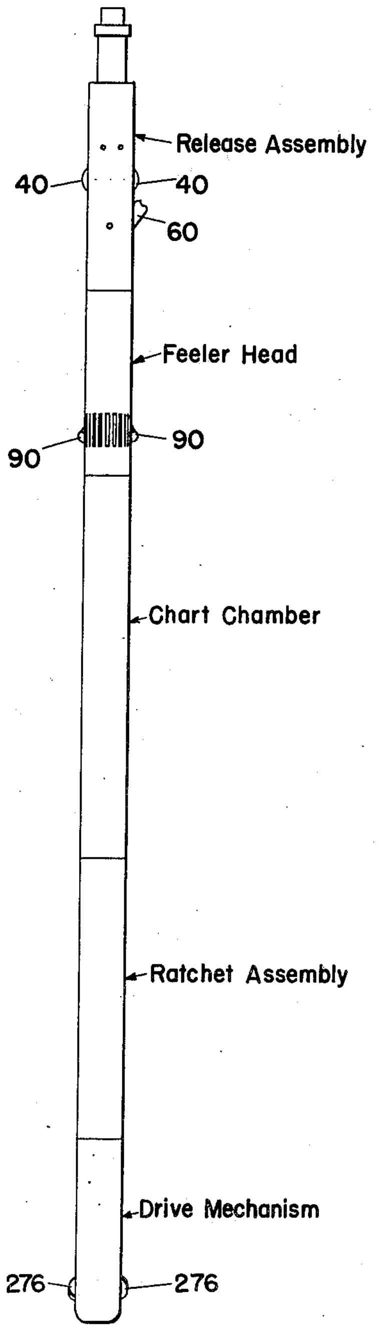
Figure 1 is an elevation of the complete calipering device.
Figure 13:
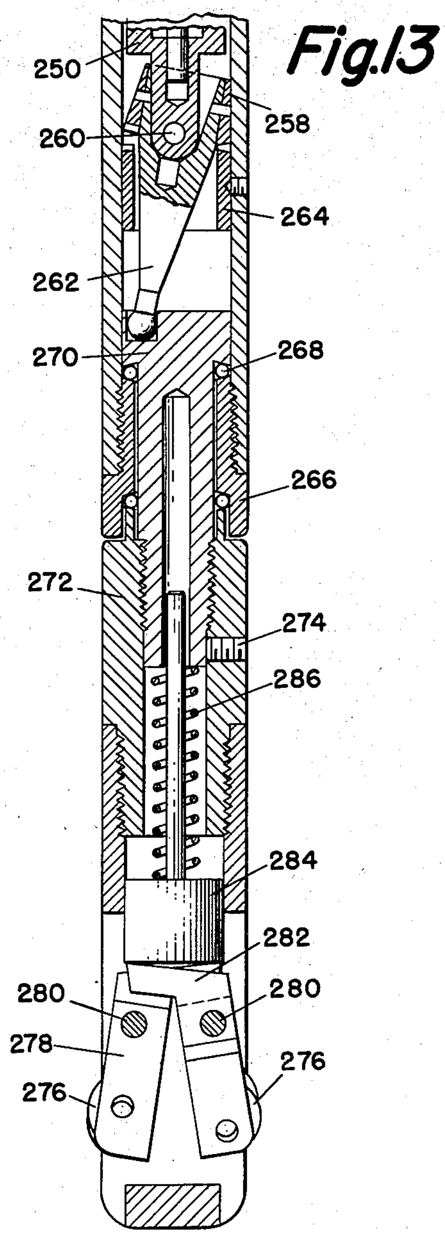

Figure 13 is a sectional elevation of the drive mechanism section of Figure 1.

Figure 14:
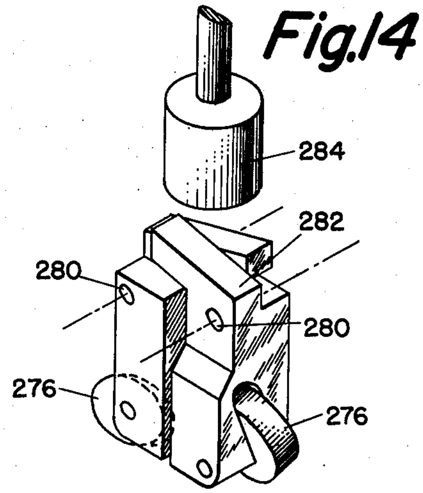

Figure 14 is a perspective showing the drive wheel arrangement in the drive mechanism section of Figure 13.

The complete calipering instrument is shown in elevation in Figure 1 as it appears ready for insertion in the tubing string to be surveyed. It comprises five sections, as shown, which are detachable from each other for adjustment and inspection purposes. The release assembly is housed in the uppermost section of the caliper body and is threaded to connect to operating lines, rods and other tube exploring devices. Adjoining the release assembly the feeler head assembly section is positioned to be controlled by the release mechanism and to effectively transmit the calipering information to the chart chamber which is immediately attached below it. The next lower section of the housing below the chart chamber is the ratchet assembly inserted to protect the driven stylus mechanism and insure accurate records. At the bottom of the housing, free to rotate and mechanically connected to the ratchet assembly and thence to the moving elements in the chart chamber, the drive mechanism is mounted. In describing the details of these sections the instrument will be considered from the top to the bottom as here outlined, and the same numerals will be used to indicate like elements throughout the drawings.

Figure 2:
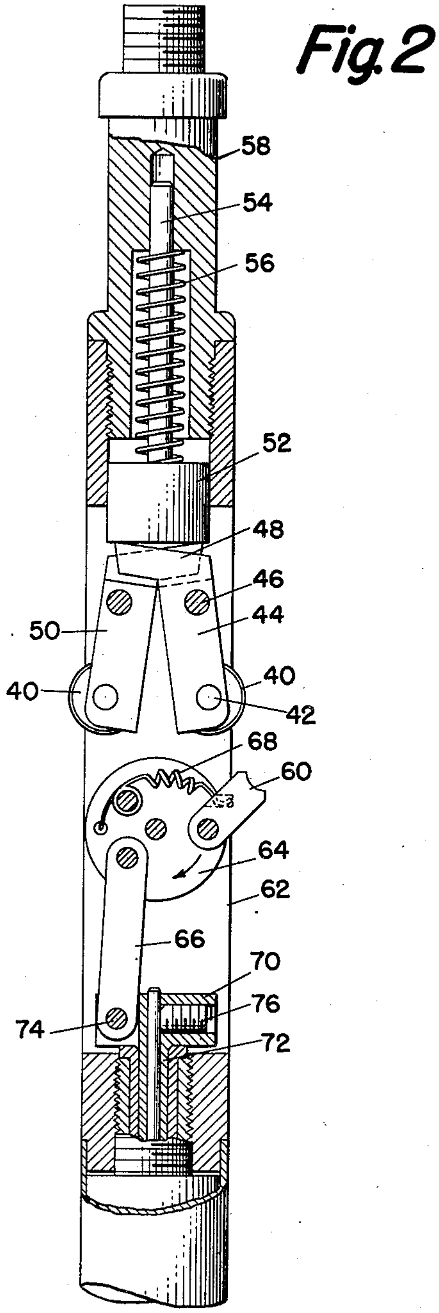
Figure 2 is a sectional elevation taken of the release assembly section of Figure 1.
Figure 3:
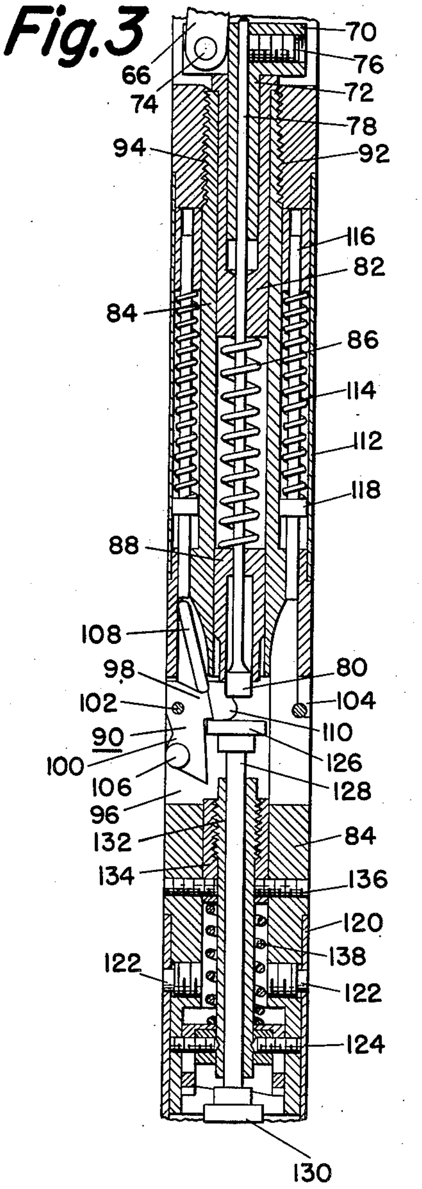
Figure 3 is a sectional elevation of the feeler head section of Figure 1.

Reference is made to Figures 1, 2 and 3 for the details of the release assembly and the connection between the release and feeler head assembly. Except for slight mechanical changes, the release assembly and the feeler head assembly of this calipering device are similar to those in my patent application Serial No. 97,940, filed June 9, 1949. Reference is made to that application for details of this mechanism. However, sufficient description of the elements will be given here to enable those versed in the art to acquire a full knowledge of the details and operation of the disclosed calipering instrument.

Returning to these figures, it will be understood that the purpose of the release assembly is to hold the feeler fingers 90 in Figure 3 retracted until the survey is to begin. One change in this device over the application of reference and which is not a part of the release assembly mechanism is the addition of a pair of loading wheels 40—40 extending outwardly through slots in the housing above the releasing mechanism to engage the tubing. Each wheel 40 is mounted by pin 42 in bell crank 44 which is pivoted as at 46 to the caliper housing. The bell crank has an inwardly extending arm 48, as distinguished from the downwardly extending arm 50, which is engaged by the head 52 of the piston 54. A compression spring 56 encloses the piston 54 and fits into the threaded cap 58 adapted to engage a lowering line or rod as previously stated.

The releasing mechanism of the release assembly includes a dog 60 shown projecting from the body of Figure 1 and in operating position in Figure 2. This latter figure also shows the transverse slot 62 in the instrument housing which permits the loading wheels 40—40 and the dog 60 to project outwardly in operating position. The cylindrical disc 64 is one of a pair, the outer one removed in the drawing, to show the linkages which retain the dog 60 in engagement with the spring 68 and the release link 66. As shown in this figure, the dog 60 is in the locked position not yet having engaged a tubing joint to be turned downwardly as indicated by the arrow and thus release the feeler fingers to calipering contact with the inner surface of the tubing string.

To release the feeler fingers to operating position, the motion set up by the dog 60 engaging a tubing joint is transmitted by the release link 66 to the head 70 of the release plunger 72 which is partially shown in Figure 2 but is more fully detailed in Figure 3 to which reference is now made. The release link 66 is connected to the release plunger head 70 by the pin 74. The end of the head opposite the connection at pin 74 is recessed to receive a set screw 76 which fastens the release rod 78 within the release plunger 72. The release rod 78 extends downwardly to terminate in the head 80 which, in the latching operation, engages notches in the feeler fingers and holds them in a retracted position for running the caliper into the tubing string preliminary to the surveying operation. A bushing 82 retains the release plunger 72 slidably aligned in the feeler head 84 and acts as a retaining surface for the centering spring 86. After the feeler fingers are released the head 80 of the release rod 78 is lifted and held in position within the centering plunger 88 with which it is in sliding engagement in the bottom section of the feeler head 84. The centering plunger is moved downwardly within the body member by the action of spring 86 into contact with the feeler fingers 90 and urges them outwardly against the wall of the tubing with equal force, thus minimizing the errors which would arise due to the center line of the caliper moving away from the center line of the tubing string.

The above description of the release assembly, the releasing mechanism and the feeler head has, more or less, closely followed the application Serial No. 97,940, to which reference has been made. Having been fully disclosed and described in detail in that application, it is not the purpose to repeat these details again, but to describe only those elements of the device which are necessary to show a complete operating tool and emphasize the inventive material with which it cooperates. Consequently, the figures showing the breakdown of the feeler head and the description of these separate elements shown in the referred to application have been omitted. Only a general description of this part of the device will be included.

Continuing with Figure 3, it will be noted that the feeler head 84 is threaded at 92 and engages a like thread 94 in the release assembly section. The feeler fingers 90 are pivotally supported in groove 104 in feeler head 84 by the pins 102 and extend outwardly through slots 96 to engage the tubing wall. (See Figure 1.) The feeler fingers 90 are in the form of bell crank levers with an inwardly extending arm 98 and a downwardly extending arm 100. The contact surface 106 is a ball of hardened steel or suitable alloy, such as carboloy, fitted into the downwardly extending arm. In general, the profile of the contact surface is designed as a small diameter ball for moving into and out of the corrosion pits. The distance from the center of this ball to the pivoting pin 102 is the same as the distance from the pivoting pin 120 to the center with respect to contact surface 110, and the angle formed by the lines connecting each center with the pivoting pin in ninety degrees. This makes the radial motion of the contact surface 106 of exactly the same magnitude as the axial movement of the contact surface 110.

After the release of the feeler fingers 90 from the retracted position shown in Figure 3 by lifting the locking piston 78 as discussed, the feeler rods 108, extending into notches in the feeler fingers, spring load the individual fingers and extend them into contact with the tubing. Spring guides 116 are arranged circumferentially around the feeler head 84 and support the feeler finger operating springs 114. The flanges 118 on the spring guides 116, aligned radially within the sleeve 112, abut the lower ends of the springs 114 causing the guides to move downward against the feeler rods and thus transit the thrust to the feeler fingers 90 through the feeler rods 108 as shown.

The next section of the caliper to be considered is the chart chamber section indicated as part of the caliper housing in Figure 1 and detailed in the lower part of Figure 3 and upper part of Figure 4. Reference will be made, in addition, to the cross-sections of Figure 4 shown in Figures 6, 7 and 8. The chart chamber assembly is exteriorly joined to the feeler head section and also with the ratchet assembly by means of the chart chamber closure 124. The union of these sections is made by a slip joint as at 120 for the upper joint and is held by chamber screws 122. The lower joint is shown on Figure 4 to be a duplicate of that described above as 120 including the chamber screw securing method.

The external connections uniting the feeler head, chart chamber and ratchet assemblies, position these sections for the operation of the internal mechanism. The transmission of the motion of the feeler arms 90 downwardly to the chart chamber will be understood by reference to the lower part of Figure 3. The rounded edge 110 of the under side of the inwardly extending arms 98 of the feeler fingers 90 are normally in contact with the upper head 126 of the stylus rod 128. On the lower end of the stylus rod 128 there is another head 130 similar to the head 126 on the upper end. A sleeve 132 is threaded into a bushing 134 as a guide for the stylus rod 128 to keep it centered in the caliper to properly connect the feeler head section with the chart chamber. Set screws 136 fasten the bushing 134 firmly in place in the bottom of the feeler head 84. The spring 138 is mentioned here as it may be considered as part of the transmitting mechanism between these two sections.

Reference to Figures 4, 6, 7 and 8 is made in order to fully clarify the elements comprising the chart chamber and the stylus operating mechanism. The compression spring 138, noted as in compression against the bushing 134 at the bottom of the feeler head assembly, forces the fixed ratchet 140 of the stop clutch 142 into engagement with the movable ratchet 144. The set screws 146 are threaded into the feeler head 84, pass through the longitudinal slots 148 in the fixed ratchet 140, and secure it against rotation by setting against the sleeve 132. The fixed ratchet 140 is therefore free to move longitudinally against the spring 138 without disturbing the stylus rod 128 for the depth of the notches 148 but is prevented from rotating.

The stop clutch 142, including the upper fixed ratchet 140 and the lower movable ratchet 144, is designed to lock the stylus operating mechanism against rotation in one direction and to freely permit rotation when the calipering operation is under way. This is accomplished by ratchet teeth engaging or slipping depending upon the direction of rotation, as is well known. The movable ratchet 144 of this clutch forms the top of the drive cage 150 which extends downwardly to a base member 152 slotted as at 154 to engage the key 156 of the drive shaft 158.

A rotatable lead screw 160 extends longitudinally of the chart chamber and is positioned eccentric thereto as shown in Figure 4 and also in Figures 6 and 7. A stylus 162 is housed in the stylus holder 164 designed as a travelling nut to fit into the drive cage 150, as shown in Figure 7, which rotates it about the lead screw 160. It is necessary that the lead screw 160 be constantly urged into contact with the lower head 130 of the stylus rod 128 and be responsive longitudinally to all recordable movements of the feeler fingers 90 transmitted to the stylus rod. This is accomplished by the lift spring 166, tending to expand, exerting an upward force on the upper flange 168. It is braced to exert this constant force against the lower flange 170 which is supported by the drive cage structure 150. The upper flange 168 is fastened to the lead screw 160 by the pin 172, while the lower flange 170 freely passes the lead screw through it. Thus, the spring 166 urges the lead screw upwardly against the stylus rod head 130 constantly. Rotary motion is transmitted to the lead screw 160 through the base member 152 of the drive cage 150 by means of a fluted or splined shaft 204 extending upwardly from the ratchet assembly section and which the lead screw is machined to receive. The stylus holder 164, responding to the rotary movement of the drive cage 150 and the faster rotation of the lead screw 160, scribes a close helical line on the chart 176. The spring 178 on the stylus holder 164 is positioned to urge the stylus 162 into contact with the chart 176. Upper and lower chart retainers 180 and 182, slotted as shown at 184 on Figure 8 to permit contraction and expansion, fasten the chart 176 in place in the caliper housing.

A disengaging device comprising a trigger member 186 and a retaining spring 188 arranged to transmit a releasing operation through the base member 152 of the drive cage 150 into the ratchet assembly section, completes the internal structure of the chart chamber. As the rotating drives for both the drive rails 150 and the threaded lead screw 160, together with the disengaging mechanism, are designed to separate at this point, another slip joint 190 similar to joint 120 at the top of the chart chamber, together with the chamber screws 192, is illustrated. An "O" ring 194 is set into a groove to retain the lubricant with which the chart chamber is filled.

Continuing downward in the examination of the details of the caliper, the ratchet assembly is the next section to be detailed and is positioned externally in Figure 1 and internally in Figures 5, 8, 9, 10, 11 and 12. Referring to Figure 5, it will be noted that the detail shown for the union with Figure 4 has been repeated. This will clarify the linkage between the chart chamber and the ratchet assembly and facilitate the explanation of the operation of the device later in the specification.

The tension spring 196, arranged to cooperate with the trigger member 186, is held in position by washer 198 and pin 200. Transverse slots 195 in drive shaft 158 receive the eccentrically movable tabbed washer 198 and hold the spring in tension until released by the trigger member 186. A supporting washer member 202 beneath the washer 198 facilitates the disengagement of the stylus operating mechanism on the downward movement of the trigger 186 as the stylus approaches the bottom of the chart marking surface. At this point reference to several figures of the drawing including the bottom of Figure 4, all of Figure 5, and the cross-section Figure 8 will clarify the structure and working relation of the elements in the ratchet assembly. The drive shaft 158 is fluted longitudinally and thereby provides space for the trigger release spring 196 on one side and the milled drive shaft 204 which meshes with the lead screw 160 on the other side. This member 158 is increased in diameter, as shown in Figure 9, in order to position and hold the drive shaft 204 and the stub shaft 206, and is slotted to hold the gears 208 and 210 which are dowel pinned to the shafts 204 and 206 respectively. A larger slot 212 is milled transversely through this member to allow space for the universal joint 214 which connects the stub shaft 206 and gear 210 to the upper ratchet 216 of the lead screw clutch 218. This upper ratchet 216 is held in engagement with the lower ratchet 220 by the compressed spring 222 and is fixed to move with the universal joint 214 by the pin 224 passing through the elongated slot 226. This spring and slot design permits the upper ratchet 216 to disengage when the lower ratchet 220 is reversed, thereby permitting slippage and the clutch to disengage. The universal joint 214 is held centered in the housing at the clutch section by a centering sleeve 228. Externally, the sleeve 228 acts as a bushing holding the drive cage clutch 230 in alignment.

For a better understanding of the dual clutch arrangement where the lead screw clutch 218 and the drive cage clutch 230 are shown in detail, reference is made to Figure 12 which is an enlargement of that portion of Figure 5 shown by the line 12—12. The outer or drive cage clutch 230 includes an upper or driven ratchet 232 which forms the bottom of the driving member 158 and a lower or driving ratchet 234.

The rotary motion from the drive mechanism is transmitted to the driving ratchet 234 by gear 236 to which it is fastened by set screws 238. The gear 236 is one of four equal gears, the remaining three mounted at right angles to each other and numbered 240, 242 and 244. The two gears 236 and 242 are aligned on the longitudinal shaft 246 which extends from and is a part of the lower ratchet 220 of the lead screw clutch 218 described above. The longitudinal shaft 246 is mounted in position by the transverse shaft 248 through which it passes. The shaft 248 mounts gears 240 and 244 so that they mesh with the horizontal gears 236 and 242 described. As the vertical gears 240 and 244 rotate freely on the shaft 248 merely transmitting movement to gear 236, it is necessary that the remaining horizontal gear 242 be actively rotated by a power source. A connector 250, drilled at 252 to receive the rotatable shaft 246, is attached to the gear 242 by set screws 254 and attached to the shaft 246 by the pin 256. It is connected to a wobble gear train positioned in the bottom of the rachet assembly section to be attached to the driving mechanism which forms the lowermost section of the calipering device.

Reference is made to Figures 1, 12 and 13 for the description of this part of the device. The connector 250 is rotated by the movable wobble gear 258 to which it is fixed by the pin 260. The wobble gear 258 is fastened to a pitman connection 262 which walks the gear 258 around a fixed gear 264 in response to the rotary motion of the driving mechanism. The number of teeth in the wobble gear 258 and the fixed gear 264 are of such relation that the motion transmitted to the connector 250 by the wobble gear 258 is at the rate of one tooth per revolution of the pitman 262.

The driving mechanism at the bottom of the calipering device is held in engagement with the pitman 262 and permitted to rotate freely by means of a threaded bushing 266, bearing raceways 268, and a machined section 270 designed to be rotatably held by the bushing. The rotating section 272 is threaded to the machined section 270 and fastened with a set screw 274. A pair of friction drive wheels 276—276 are mounted in bell crank levers 278 at an angle to the tubing wall so as to follow a helical trace as the caliper moves therethrough and thus rotate the driving head. Engagement with the tubing wall is assured by pivoting the bell cranks with pins 280 and exerting a constant pressure on the inwardly extending legs 282 by a piston 284 urged downwardly by the compressed spring 286.

It is believed the detailed description above will be sufficiently understandable to those versed in the art to visualize the operation of the device. However, as the elements are combined to give a long sought for result with a high degree of accuracy and exceptional performance characteristics, the movement of the elements in a typical calipering operation will be traced. This instrument is designed to operate in small diameter tubing under high pressures and in the presence of fluids and gases including salt water and drilling muds. The elements of the caliper for use under such general conditions are made to be highly corrosion resistant either by making the parts of stainless steel or Monel metal, or by cadmium or chromium plating hardened tool steel.

Preparatory to using the calipering instrument for a tubing survey, it is possible to separate it into its component parts, as is evident in the various figures of the drawing showing the assembly joints, and make a thorough check of the mechanism for undue wear and operability. The usual preparation for a calipering run is limited to separating the instrument at the slip joint 120 which unites the feeler head section with the chart chamber and lifting the drive cage 150 and lead screw 160 assembly with the stylus holder 164 from the chart chamber. The upper and lower chart retainers 180 and 182 are contracted to release the used chart 176 and a new one is placed in the chamber. The chart may be of any preferred material but is usually made of sheet steel shim stock properly treated on the tracing face so as to be readily marked by the stylus 162. The new chart 176 is held securely in place by the upper retainer 180 and the lower retainer 182, as shown in Figure 4. These retainers position the chart axially and hold it flat against the chamber wall, preventing any movement of the chart. To place the stylus in position ready for operation, the stylus holder is rotated until it is at the top of the lead screw and the stylus is on line with the upper edge of the chart. The stylus operating assembly is then replaced in the chart chamber, carefully assembling the separate drives 204 and 158 in their corresponding driven parts and the release trigger 182 is aligned to operate the disengaging mechanism. Lubricating oil is then poured into the chart chamber until the ratchet assembly and chart chamber sections are filled to keep fluids in the tubing to be calipered at high pressure from affecting the internal mechanisms. The device is then reassembled by closing the joint 120 and engaging the chamber screws 122 with the chart chamber closure 124.

As the full pressures within the tubing are admitted to all parts of the caliper mechanism, including the recording stylus and chart, and equalized throughout by means of the lubricant filling these spaces, packing glands, and gaskets with their inherent frictional drag are eliminated. The result of the equalization and balancing of the well pressures is that the stylus follows the smallest variation of each feeler arm as it explores the inner wall of the tubing string. The lubricating oil is retained within the caliper by the synthetic rubber O ring gasket 194 set in the groove at the lower chart chamber joint 190 and positioned there to prevent leakage.

The caliper is then made ready for insertion in the tubing string to be explored by pressing the feeler fingers into the retracted position and holding them there while the head of the released rod 80 is lowered into locking engagement with the notches provided in the feeler fingers by rotating the cylindrical discs 64—64 which also places the dog 60 in the locked position. The feeler fingers, being urged outwardly by the piston-like action of the feeler rods 108, press against the release rod 78 and the upper head 126 of the stylus rod 128, as shown in Figure 3, until the release rod is lifted. The caliper is now ready to survey the tubing string of our example.

The caliper is attached to a lowering line or rod and is lowered in the tubing to the desired depth selected for the beginning of the calipering survey. During the lowering of the caliper the feeler fingers remain in the retracted position and the dog 60 is in light engagement with the tubing wall having sufficient movement to pass freely downward past the tubing joints without disturbing the release mechanism. The friction engaging wheels 276 in the rotatable head of the driving mechanism at the bottom of the calipering device are in contact with the inner wall of the tubing tracing a helical path in a direction opposite to that in which they will rotate during the calipering run as the instrument is moved in the upward direction. The angle at which these drive wheels engage the tubing wall and the direction of movement of the caliper determines the direction of rotation. This has been considered in the selection and positioning of the clutches used in the driving and scribing mechanism and will be more fully considered later in the disclosure. To maintain the caliper in alignment and prevent the entire device from rotating under the action of the drive wheels 276, the loading wheels 40 are spring loaded to extend from the housing to meet the tubing wall. These are shown in Figure 2 above the release mechanism as one convenient location on the housing.

On reaching the desired depth in the tubing, upward movement of the instrument engages the dog 60 in the first tubing joint above the stopping point and causes the release assembly to function. The dog 60, in Figure 2, is forced downwardly as it is caught in the tubing joint and the caliper continues the upward movement, causing the discs 64—64 to rotate in the direction shown by the arrow.

The connecting linkage 66 lifts the release rod 78 and disengages the head 80 from locking engagement with the notches in the feeler fingers 90 shown in Figure 3. This permits the feeler fingers to spring outwardly into contact with the tubing walls under the urging of the feeler rods 108 and begins the calipering operation. The pairs of discs 64—64, having rotated to lift the release rod 78, drop the dog downward into the slot 62 and out of contact with the tubing wall where it remains until set for another "run" as already described. At all times the centering plunger 88 is urged downwardly by the compressed centering spring 86, restrained in upward movement by the bushing 82 above, to constantly engage the upper edge of the inwardly extending arms 98 of the feeler fingers 90. It will be understood that the only time this is not true is when the individual feeler fingers separately extend farther outward than the others into a pit or depression. This equal pressure on all the feeler fingers, under normal conditions and on the greater number where pits are encountered, centers the caliper within the tubing string and minimizes errors on the charted record which would otherwise arise.

In addition to the uniform spring pressure of the centering plunger on the feeler fingers, each finger is separately actuated outwardly by the feeler rods 108 which transmit the pressure of the spring guides 116 to each of the fingers separately. The outward movement of each individual finger is limited only by the tubing wall. The caliper is adjusted so the extreme diameter reached by the fingers is the same as the outside diameter of the tubing, thus accurately responding to couplings or collars or to extreme pitted conditions. This setting is, therefore, large enough to indicate complete penetration of the tubing by corrosion or erosion and serves as a reference in making an accurate interpretation of the depth of the corroded area in the tubing. Also, this setting is small enough to permit easy entry of the caliper into the surface connections of the well and to travel downward through the tubing couplings if the feeler arms are not in the retracted or locked position as required in repeating surveys over limited tubing lengths. The ideal feeler finger loading is the minimum loading attainable which will minimize the wear on the feeler finger contact surface 106 and possible damage, and yet produce an accurate chart if only one feeler finger moves out to its maximum limit of travel. An individual feeler operating spring 114 should be strong enough to move its feeler finger firmly out to its limit of travel while at the same time depressing the stylus lift spring 166 (Fig. 4). In turn, the stylus lift spring must be of sufficient strength to support the lead screw 160 and stylus holder 164 and keep the head 126 of the stylus rod 128 in continuous contacts with the feeler fingers even when the feeler fingers are moving into and out of corrosion pits and tubing collars at fast calipering speeds.

During the downward movement of the caliper in the tubing, the loading wheels 40 and the driving mechanism friction engaging wheels 276 are in contact with the tubing wall and rotating at a speed commensurate with the rate of movement downward. The angle of the drive wheels 276, which engage the inner tubing wall in a spiral trace as the calipering instrument moves up or down, is such as to rotate the driving head counterclockwise, looking downward into the tubing, as the caliper descends, and to rotate it clockwise on the ascent. This is evident in Figures 13 and 14. Therefore, as the calipering device descends in the tubing, the driving mechanism is rotating counterclockwise (viewed from the top of the tubing) and causes the wobble gear 258 to likewise rotate counterclockwise on the fixed gear 264. The connector 250, following the direction of the wobble gear to which it is pinned, rotates gear 242 about the shaft 246 in this same direction which is reversed to a clockwise direction in gear 236. The ratchet 234 of the driving clutch 230 will not engage the driven ratchet 232 in clockwise rotation, nor will the ratchets of clutch 218 engage, being thus designed to cooperate with the stop clutch 142 at the top of the drive cage assembly 150. Consequently, no trace is made on the chart at this time. As the caliper is moved upward and the release rod 78 operates, freeing the feeler fingers, the rotary motion of the driving head is reversed and thus reverses the direction of drive of all the members considered. The clutches 218 and 230 reverse their operation also, the driving clutch ratchets engaging the driven ratchets and the stop clutch ratchets 140 and 144 releasing. A rotary motion is imparted to the stylus holder by the drive cage 150 and the fluted drive shaft 158 which, as it rotates, carries the universal joint 214 with it. The lower end of the universal joint is, however, engaged by the clutch 218 and is rotated in the same direction as the connector 250 to which it is secured by pin 256.

It will be apparent from Figure 12 that the ratchet teeth in the lead screw clutch 218 are designed to engage only as the connector 250 and longitudinal shaft 246 are rotating clockwise as here considered. Rotation in a counterclockwise direction will cause the clutch to slip. Therefore, as the caliper is pulled upward in the tubing, the clockwise rotation of the driving mechanism is transmitted to both the lead screw clutch 218 and the drive cage clutch 230, and is conveyed respectively to the universal joint 214 and the drive cage 150.

Before considering the full effect of the rotary motion initiated as outlined in the preceding paragraph as a part of the caliper operation, it is proposed to discuss the limited transfer of rotation between the universal joint 214 and the lead screw 160. Reference is made to Figures 5 and 9 which will be discussed in detail. The rotary motion transmitted to the stub shaft 206 by the universal joint 214 is in the opposite direction and at the same speed as that transmitted to the drive cage shaft 158. This is evident as the common connector 250 is the source of movement for both elements but the gear 236, driving the cage shaft 158, rotates in the opposite direction to the connector 250. The gear 210 therefore rotates clockwise in the calipering operation while the drive cage shaft 158 is rotating counterclockwise. The gear 208 meshes with the gear 210 and is rotated counterclockwise at the same speed, which is also the speed of the drive cage shaft 158. The gear train of gears 208 and 210 together with the universal joint 214 are, however, being rotated counterclockwise by the shaft 158 in which they are mounted, thereby causing the gear 208 to not only be rotated by gear 210 but to add another rotation at the same speed. This is indicated on Figure 9 by the arrows showing rotary direction. It will be recognized that the lead screw 160 will rotate twice with respect to stylus holder 164 each time the stylus holder makes one revolution with respect to the chart and that the direction of rotation will be the same.

One of the requisites of any mechanically scribed chart is that the record be clear and distinct. The helix scribed by the stylus 162 on the chart 176 has a pitch which is two times that of the lead screw under the described operating conditions. This enables a lead screw to be used which is comparatively small and light in weight. This results in lighter and smaller operating elements throughout the device. As the pitch of the scribed helix is constant throughout the length of the chart the result is a record of a series of parallel lines equally spaced apart.

Having established the initial rotary motion in the chart operating elements, the operation of the calipering device will be continued by reference primarily to Figures 4 and 5.

This compacted helical movement of the stylus on the chart by the driving mechanism described is interrupted by the action of the released feeler fingers which are exploring the inner wall of the tubing, as the instrument moves upwardly, for pits and joints. A pit in the tubing permits one or more of the feeler fingers to move outward and, at the same time, to press downwardly on the stylus rod 128. This is indicated by Figure 3 of the drawing. It will be noted that should two or more feeler fingers move outwardly at the same time, the effect of that which moves out the greatest distance is alone transmitted to the stylus rod. This reveals the locus and measurement of the greatest defect and is, therefore, a measure of the true damaged condition. The sum of the depths of the pits, depressions and joints, is never measured by this device. As the stylus rod is moved downward, the lower head 130, as shown in Figure 4, depresses the rotating lead screw 160. The drive cage 150, rotating in the same direction, engages the stylus holder 164 and also rotates the eccentrically placed lead screw as shown in Figures 4, 5 and 9. The upper end of the lead screw is therefore rounded as shown, and keeps a friction-reduced contact with the lower head 130 of the stylus rod 128. The downward, longitudinal movement of the lead screw interrupts the helix which the rotating stylus is scribing on the chart. The resulting log, when the chart is removed from the caliper and spread out flat, is a series of parallel lines which show at scale every action of the feeler arms. The spacing of the lines, determined by the pitch of the lead screw and the relative rotation of the lead screw and the stylus holder, permits visual examination of the survey and exact measurement of the corrosion pits. Tubing joints show clearly as a series of practically regular interruptions for standard length tubing and are readily identified for any length tubing. The chart lines will vary from almost straight to very jagged, depending on the severity of the corrosion. The lead screw, which receives the axial motion from the stylus rod, is supported by the spring 166 extending between the flanges 168 and 170 as shown in Figure 4. As the upper flange 168 is fastened to the lead screw by a pin or set screw 172 it can be spaced from the lower flange 170 to further compress or release the spring 166. The distance through which the lead screw may be depressed and consequently move the stylus is controlled by the adjustment of the stylus rod sleeve 132 in the threaded bushing 134. The ability to limit the lateral motion of the stylus in response to the action of the feeler fingers enables a clearer chart record to be produced.

A particular advantage of the disclosed device resides in the ability to re-caliper a specific length of tubing without removing the device from the string for resetting the chart and stylus. Within the limits of the chart space readings may be repeated on a particular section of tubing as desired. It has been shown above that the calipering operation is performed only as the instrument moves upward in the tubing and that when moving downwardly the clutch arrangement is designed to prevent the rotation of the stylus holder and the lead screw. Consequently, a length of tubing may be surveyed by the upward movement of the caliper and resurveyed until the chart surface is exhausted and the stylus is moved to the bottom of the chart chamber by repeatedly dropping the instrument down to the point of beginning and again surveying on the upward movement. The release mechanism, having once been unlatched, is not set again but presents no difficulty as the dog is dropped into the slot and readily clears the tubing joints. The feeler fingers also clear the obstructions in the tubing string due to the several bevelled surfaces which are evident in Figure 3.

Should the instrument be operated beyond the chart limits, however, the record already obtained is preserved unmarred by the operation of the disengaging trigger 186 shown in detail in Figure 4. All recording action on the chart requires that the stylus rotate and move downwardly on the lead screw even though the lead screw is rotating relative to the driven stylus holder in order to maintain a legible pitch of the scribed helix on the chart. This direction and rate of travel is required notwithstanding the axial movement of the lead screw in response to the feeler finger action as described. Consequently, the survey will ultimately move the stylus holder to the bottom of the chart regardless of whether the run is continuous or repetitious, as the clutch arrangement prevents the upward movement of the stylus on the lead screw even though the driving mechanism is rotatably responsive to both upward and downward movement. Figure 4 shows the disengaging trigger 186 in elevation supported by spring 188 in the base member 152 of the drive cage 150. The horizontal cross-section illustrating the relative positions of the fluted drive shaft 158 and the trigger tension spring 196 connected to the washer 198 is shown in Figure 8. As described, the stylus holder 164 is moved downward on the lead screw 160 by the rotary motion of the drive cage 150 during the scribing operation until the bottom of the chart 176 is reached. At this point, the bottom of the stylus holder 164 engages the top of the trigger 186. Continued rotation moves the stylus holder farther down on the lead screw and presses with increasing pressure on the trigger until the eccentrically movable tabbed washer 198, to which the spring 196 is fastened by its upper end, is moved away from the slots 195 in the drive shaft 158. The chisel point of the trigger member 186 fits behind the spring 196 where it is secured in the tab of the washer 198. While the washer 198 is engaged in the transverse slots 195 of the drive shaft 158 (Figure 8) the spring 196 is held in tension along the drive shaft fastened on the lower extremity by pin 200. As the trigger 186 is moved downwardly by the stylus holder the eccentrically movable washer 198 is released from the transverse slots 195 and rests on the washer 202. This movement exerts the full tension effect of the spring on the drive shaft 158 lifting it together with all the elements above the clutches 218 and 230. Under the force of this upward lift the driving and the driven ratchets of these clutches are separated. The driving mechanism is then free to rotate without transmitting motion to the stylus driving mechanism from which it has been disengaged.

The surface operating crew keeps a running tally of the number of feet of tubing through which the survey is made by upward movement of the caliper. The fixed measurements of the chart length and lead screw pitch being known, the number of feet of tubing which can be calipered on one chart is readily determined. The survey having been made, the caliper is withdrawn from the tubing string in reverse operation to that described for starting the operation. The chart is released from the chart chamber and spread for study. Photostats are readily made from the chart and enlarged, if desired, for extensive interpretation and inclusion in survey reports.

The example selected for disclosing the operation of the caliper considered a well under pressure in which the tubing string was the object of the survey. This is not the limit of the operational possibilities of this device and is not so intended. The calipering instrument, as here disclosed, is flexible in application and may readily be used to survey any conduit, pipe or tube in any position and under conditions ranging from atmospheric to very high pressures.

Although the principal purpose intended for the device disclosed is, as stated, to improve the drive mechanism for all calipers and for use in calipering small diameter tubing, it may well be used in any size or type tubing. The selection and arrangement of the elements present a combination which is particularly satisfactory in serving these purposes and, also, in obtaining an efficient and accurate survey. The preferred embodiment shown here is not the only way in which the selected elements may be arranged, and it is intended that this invention will be limited only by the scope of the appended claims.

I claim:

1. In an internal tube wall calipering and recording device adapted to be passaged through an extended length of tubing the combination comprising a housing carrying calipering means, a cylindrical recorder member positioned longitudinally within the housing, a rotatable stylus lead screw positioned longitudinally within the housing and adapted for limited longitudinal movement in response to movement of said calipering means, a stylus member threadably connected with said lead screw and rotatable with respect to said recorder member, means for preventing rotation of said housing as the device is passaged through the tubing, a drive member rotatably mounted axially of the housing, means protrusive from said drive member for pressure contact with the tube wall, said protrusive means including at its tube contacting end a rotatably mounted wheel angularly disposed with respect to both the axis and transverse section of the device, whereby said wheel follows a helical path when the device is passaged through the tubing, and transmission means connecting with said drive member for rotating said stylus member at a predetermined rate with respect to the drive member rotation and simultaneously rotating said lead screw in the same direction at a rate greater than said predetermined rate during a calipering passage of the device.

2. In an internal tube wall calipering and recording device adapted to be passaged through an extended length of tubing the combination comprising a housing carrying calipering means, a fixed cylindrical recorder member positioned longitudinally within the housing, a rotatable stylus lead screw positioned longitudinally within said recorder member and adapted for limited longitudinal movement in response to movement of said calipering means, a rotatable stylus member threadably connected with said lead screw, means for preventing rotation of said housing as the device is passaged through the tubing, a drive member rotatably mounted axially at one end of the housing, a pair of resiliently urged arms protrusive from said drive member for pressure contact with the tube wall, each of said arms carrying at its tube contacting end a rotatably mounted wheel angularly disposed with respect to both the axis and transverse section of the device, whereby said wheels follow helical paths when the device is passaged through the tubing, and transmission means connecting with said drive member for rotating said stylus member at a predetermined rate with respect to the drive member rotation and simultaneously rotating said lead screw in the same direction at a rate greater than said predetermined rate during a calipering passage of the device.

3. In an internal tube wall calipering and recording device adapted to be passaged through an extended length of tubing the combination comprising a housing carrying calipering means, a cylindrical recorder member positioned longitudinally within the housing, a stylus lead screw positioned longitudinally within the housing and adapted for limited longitudinal movement in response to movement of said calipering means, a rotatable stylus member threadably connected with said lead screw, driving means carried by the housing and operable by pressure contact with the tube wall, and transmission means connecting with said driving means for rotating said stylus member at a predetermined rate with respect to the driving means rotation and simultaneously rotating said lead screw in the same direction at a rate greater than said predetermined rate during a calipering passage of the device.

4. In an internal tube wall calipering and recording device adapted to be passaged through an extended length of tubing the combination comprising a housing carrying calipering means, recording means within the housing including a recorder member and a stylus member, means for preventing rotation of said housing as the device is passaged through the tubing, a drive member rotatably mounted axially of the housing, means protrusive from said drive member for pressure contact with the tube wall, said protrusive means including at its tube contacting end a rotatably mounted wheel positioned angularly with respect to both the axis and transverse section of the device, whereby said wheel follows a helical path when the device is passaged through the tubing, and transmission means between said drive member and said recording means for effecting relative movement between said recorder and stylus members.

5. In an internal tube wall calipering and recording device adapted to be passaged through an extended length of tubing the combination comprising a housing carrying a calipering means, recording means within the housing including a recorder member and a stylus member, means for preventing rotation of said housing as the device is passaged through the tubing, a drive member rotatably mounted axially at an end of the housing, a pair of resiliently urged arms protrusive from said drive member for pressure contact with the tube wall, each of said arms carrying at its tube contacting end a rotatably mounted wheel positioned angularly with respect to both the axis and transverse section of the device, whereby said wheels follow helical paths when the device is passaged through the tubing, and transmission means between said drive member and said recording means for effecting relative movement between said recorder and stylus members.

JOHN V. FREDD.

No references cited.